Feb. 24, 1953  T. M. BERRY  2,629,843
AUTOMATIC ELECTRICAL MEASURING DEVICE
Filed March 22, 1951
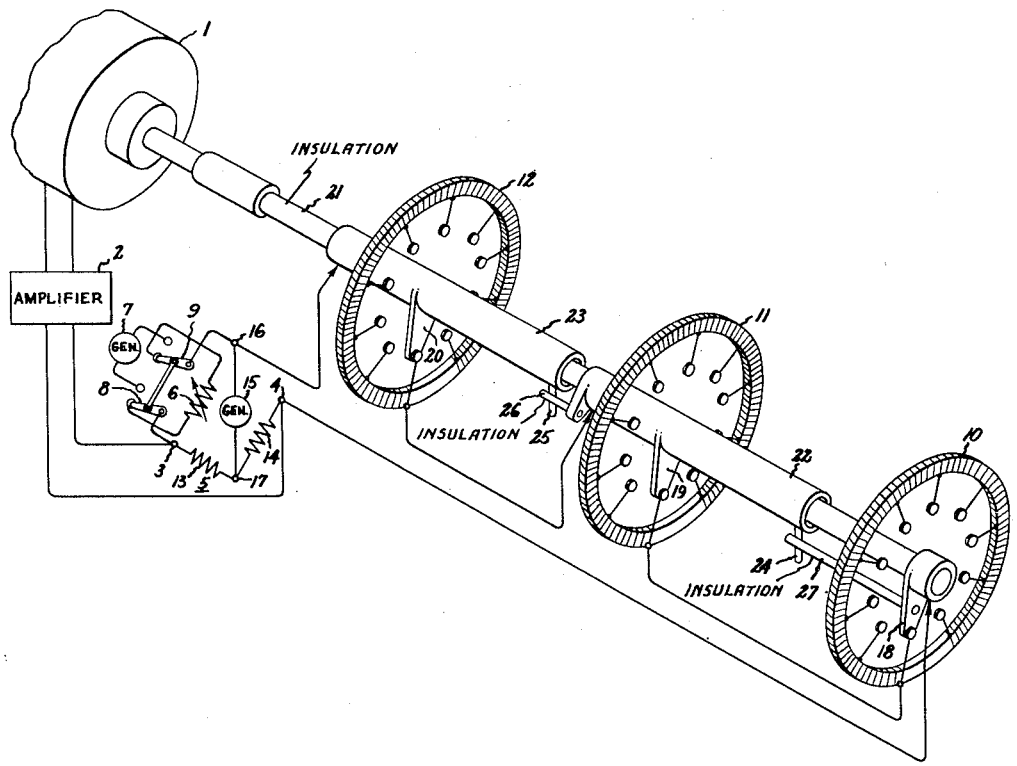
Inventor:
Theodore M. Berry,
by Paul A. Frank
His Attorney.

Patented Feb. 24, 1953

2,629,843

UNITED STATES PATENT OFFICE 2,629,843

AUTOMATIC ELECTRICAL MEASURING DEVICE

Theodore M. Berry, Schenectady, N. Y., assignor to General Electric Company, a corporation of New York Application March 22, 1951, Serial No. 216,942

3 Claims. (Cl. 318—29)

This invention relates to electrical devices for measuring impedance and voltage and more particularly to automatic devices of that sort.

In certain electrical apparatus, such as electric computers and multipliers, it is necessary to continuously measure a periodically varying impedance or voltage. In order that a satisfactory rate of operation be obtained, it becomes almost essential that some automatic means be provided to measure the varying quantity. Of course, whatever automatic means is employed, it should produce as accurate results as would a manually-operated device of the same sensitivity.

It is the object of this invention, therefore, to provide a new and improved device for automatically measuring impedance.

It is another object of this invention to provide a new and improved device for automatically measuring voltage.

It is still another object of this invention to provide a new and improved automatic device which can be used to measure either voltage or impedance.

In carrying out this invention, in one preferred embodiment thereof, there is provided a bridge circuit, one leg of which is comprised of the electrical unit whose impedance or voltage is to be measured and another leg of which is comprised of a variable impedance unit. The other two legs of the bridge are formed of standard impedances. A standard voltage is applied to the input terminals of the bridge and a reversible motor is connected across the output terminals.

The variable impedance unit consists of a plurality of impedance members. The first of these impedance members has a predetermined impedance value, and the impedance values of the remaining members are in a geometric progression relationship to it and to each other, the impedance of each member being a constant times the impedance of the member immediately preceding it. For example, in a preferred embodiment, the impedance of the first member is 9 units, the impedance of the second member is 90 units, and the impedance of the third member 900 units, etc. However, workable voltage and impedance measuring devices embodying this invention may be built using other geometric progressions. For example, the progression 3, 9, 27, 81, etc., and the progression 8, 64, 512, 4,096, as well as several others may be used in the variable impedance unit. In most of the progressions, except the preferred 9, 90, 900, etc., progression, the constant multiplication factor, hereinafter called $n$, is the first number in the progression.

Each of the impedance members of any variable impedance unit is divided into as many equi-impedance tapped portions as the $n$ of the associated progression, and from these tapped portions leads are brought out from the $n-1$ inner taps and the two end taps to $n+1$ contacts. In this case, the 9, 90, 900 progression is an exception in that there are $n-2$ inner taps and thus $n$ or 10 contacts per impedance member. For ease of construction, these contacts are circularly disposed, but other patterns could be employed.

Arranged to engage the contacts of each of the impedance members is a separate movable contact arm. One contact arm, that of the first or lowest magnitude impedance, is mounted on the shaft of a reversible motor so that it rotates with the motor, while the other contact arms, though also rotatably mounted, are not direct-coupled to the motor. The various contact arms are provided with projections which engage projections on the arms adjacent thereto, whereby each of the arms is actuated in sequence. Each arm is moved by and together with the preceding arm upon movement of the preceding arm past a predetermined point. Thus, the contact arm of the impedance member following the first member is actuated by the contact arm of the first member when the latter arm is moved through a certain position and thereafter moved with it as long as the same direction of rotation is maintained. Upon a reversal of direction, the first contact arm is moved approximately 360° before it again engages the following or second contact arm. However, then both arms again rotate with each other. This same relationship exists between the second contact arm and the third contact arm, between the third and fourth, etc.

The various impedance members are connected in series conducting relationship to form the above mentioned leg of the bridge circuit. Each impedance member is joined in the circuit through its contact arm and an end tap so that movement of the contact arm changes the impedance value presented to the circuit.

The legs of the bridge are so arranged that the bridge may be balanced, i. e., a measurement made of the unknown impedance or voltage, by changing the impedance values offered by the tapped impedance members. This is done automatically since, if the bridge becomes unbalanced, an error signal of the correct polarity or phase is automatically supplied to the motor, i. e., if the bridge is unbalanced in one direction, a voltage of one polarity or phase is impressed on the motor, whereas if the bridge is unbalanced in the opposite direction, a voltage of opposite polarity or phase is impressed upon the motor. By use of a decade structure, such as described above, in which each impedance member is $n$ times the magnitude of the preceding member, and in which each member is provided with $n$ tapped portions and the associated $n+1$ contacts, all unitary impedance values up to the maximum impedance value of the impedance unit may be supplied through automatic rotation of the motor. The 9, 90, 900, etc., progression is, of course, an exception to the rule as noted above in that there are with it $n-1$ tapped portions and thus $n$ contacts. It may be necessary, due to the particular mechanical linkage between contact arms, for the motor to rotate in both directions before it stops at the correct impedance. However, when the correct impedance is reached, the motor stops, since there is then no error signal from the bridge to actuate it.

For a better and more complete understanding of my invention, together with additional objects and advantages thereof, reference should now be had to the following description and accompanying drawing, which is a diagrammatic sketch of an automatic voltage and impedance measuring device embodying this invention.

Referring to the diagram, a reversible motor 1 is connected to be energized by the output of a power amplifier 2 to which the input signal is supplied from the output terminals 3 and 4 of an impedance bridge 5. One leg of bridge 5 consists of a plurality of parallel branches in which may be inserted the electrical units of whose voltage or impedance a measurement is desired. For example, in the diagram this leg comprises two parallel branches, one of which includes an electrical unit 6 that has a periodically varying impedance and the other which includes a voltage source, such as generator 7, that has a periodically varying output voltage. Two-position ganged switches 8 and 9 are included in the branches so that only one of the electrical units may be connected into bridge 5 for measuring purposes at any one time. A second leg of bridge 5 consists of a variable impedance unit including the tapped impedance members 10, 11 and 12 and the other two legs are respectively comprised of standard impedances 13 and 14. A generator 15 supplies voltage to the input terminals 16 and 17 of the bridge.

Each of the tapped impedance members 10, 11 and 12 is provided with 10 equi-spaced taps, end taps included. Between any two taps of impedance 10 there is unit impedance, between any two taps of impedance member 11 ten times that or 10 units; and between any two taps of impedance member 12, 100 units. Thus, the three tapped impedance members form a decade system embodying the progression 9, 90, 900 and thereby are capable of supplying any unitary impedance between 1 and 999.

Each of the tapped impedance members is provided with a contact arm which is movable into and out of engagement of the contacts thereof. Thus contact arm 18 cooperates with impedance member 10, contact arm 19 with impedance member 11, and contact arm 20 with impedance member 12. Contact arm 18 is mounted on the shaft 21 of motor 1 and rotates at all times with it. Contact arms 19 and 20, however, are mounted respectively on sleeves 22 and 23, which are positioned rotatably around shaft 21 but are not turned by it. A radially projecting stop or projection 24 is mounted on the end of sleeve 22 adjacent selector 18, while a similar stop or projection 25 is mounted on the end of sleeve 23 adjacent sleeve 19. Secured to sleeve 22 is a transfer rod 26 which extends longitudinally along shaft 21 to engage stop 25. Another transfer rod 27 is mounted on selector 18 and extends longitudinally along shaft 21 to engage stop 24. Neither transfer rod is, however, secured to its associated stop. To insulate the contact arms from one another as is necessary for operation of the device, transfer arms 26 and 27 and shaft 21 are formed of an insulating material.

In operation of the device, motor 1 is actuated by an error signal from bridge 5, the polarity or phase of the signal and thus the direction of the rotation of the motor depending upon in which direction the bridge is unbalanced. For example, assuming that switches 8 and 9 are in the position illustrated in the diagram and that the impedance of electrical unit 6 is such that 687 units of impedance are required from the tapped impedance members to balance the bridge, and further assuming that the device is in the zero impedance position shown in the drawing, the error signal will cause motor 1 to turn to increase the impedance. On the first revolution, contact 18 will increase the impedance of impedance member 10 from 0 units to 9 units and then back to 0 again. Then, however, rod 27 will engage stop 24 and selector 19 will also turn. The impedance will increase 11, 22, 33 . . . 99 and back to 0. Now, rod 26 will engage stop 25 and the impedance will increase 111, 222, 333, 444, 555, 666, and 777.

When 777 is reached, the error signal and thus motor 1 will reverse. Contact arm 18 will reverse with the motor but contact arms 19 and 20 will remain still, since the transfer rods are no longer applying force to the stops. The impedance will decrease to 770, then to 779, 778, and back to 777. Now, one revolution of motor 1 having been completed in the opposite direction, rod 27 will again engage stop 24 and turn contact arm 19 in the new direction. The resistance will decrease to 766, 755 . . . 700 and up to 799, 788, and 777. At this point, rod 22 again engages stop 21 and contact arm 16 also begins to rotate and the impedance value moves to 666.

The error signal and motor 1 again reverse, and impedance changes 667, 668, 669, 660, 661 . . . to 666. Contact arm 19 is again picked up and the impedance moves to 677 and then to 688. Again motor 1 reverses and the impedance changes to 687. This balances bridge 5, thus removing any error signal from motor 1. Therefore, motor 1 stops at the correct impedance value of 687 units. This particular numerical example was selected merely for ease of explanation since the illustrated device will automatically supply any required impedance from 1 to 999 units to balance bridge 5. The value of the measured impedance is determined by visual inspection of the contact arms on the tapped impedance members.

Now if it were desired to measure the voltage of generator 7, switches 8 and 9 would be thrown to their other position to connect generator 7 into the bridge circuit. Then a similar sequence of rotations would occur until the bridge was balanced so that the voltage across the variable impedance unit equaled the voltage of generator 7. In this case, the device obtains a voltage measurement by determining the impedance necessary to cause a voltage drop between terminals 16 and 4 of bridge 5 that is equal to the unknown voltage. Then knowing the voltage applied by generator 15 between terminals 16 and 17 and the impedance value of standard impedances 13 and 14, the unknown voltage may be determined by a simple proportion. If quick answers are desired, a calibration curve or chart could be set up for any particular input voltage from generator 15.

As previously mentioned, other geometric porgressions may be used with the device. For example, suppose that a variable impedance unit were built using the progression 8, 64, 512, 4096, etc. and it were desired to measure a voltage or impedance requiring the variable impedance unit to supply the same impedance of 687 units for which operation of the illustrated device was described. Assuming then that the first impedance member has an impedance value of 8 units, the second member a value of 64, the third of 512, etc. and each is divided into 8 sections, then starting from the 0 impedance position on the first revolution of the associated motor, the impedance would be increased by the first contact arm from 1 to 8 units and then back to 0 again. Then the contact arm of the second impedance member would be picked up and the impedance would increase 9, 18, 27, ... 72 and back to 0 again. The third contact arm would be picked up and the impedance would rise 73, 146, 219 ... 584 and back to 0 again. The fourth contact arm would then be actuated and the impedance would increase to 585 and then to 1170. At this point the motor would reverse and the impedance would go 1169 then up to 1176, 1175 ... 1170. At this point the second contact arm would again be actuated and the impedance would fall off to 1161, back up to 1224, 1215, ... 1170. The third contact arm is again picked up and the impedance follows the path 1097, 1608 ... 1170. The fourth contact arm is then set in motion and the impedance falls to 585 and the motor reverses. Again only the first contact arm rotates. The impedance goes 585, 586 ... 592, 585 and the second contact arm is picked up. The impedance then rises 594, 603 ... 648 back to 585 and the third contact arm begins to move to change the impedance. The impedance rises to 658, 731 and the motor reverses. The first contact arm rotates in the opposite direction and the impedance goes 730, 729, 736 ... 731. The second contact arm begins to rotate in the new direction and the impedance falls off 722, 713 back to 776 ... 731. The third contact arm is picked up and the impedance moves to 658 and the motor once again reverses.

The first contact arm changes the impedance to 659, 660 ... 664, 657, 658 and the second contact arm is actuated. The impedance is varied 667, 676, 685 to 694, and the motor again reverses.

The first arm rotates alone to change the impedance 693 ... 689 up to 696, 695 and back to 694. The second contact arm is picked up and the impedance is changed to 685 The motor reverses and the first contact arm rotates to bring the impedance to 686 and 687, where the device is then inactivated by the removal of the error signal. Thus it is obvious that the same result may be obtained by the use of more than one geometric progression, although the result may be secured in most cases more rapidly by the use of the 9, 90, 900, etc. progression.

Therefore, while there has been described what at present is considered to be the preferred embodiment of this invention, it will be obvious to those skilled in the art that numerous modifications and alterations may be made therein without departing from the invention, and it is thus intended in the appended claims to cover all such modifications and alterations as fall within the true spirit and scope if the invention.

What I claim as new and desire to secure by Letters Patent of the United States is:

1. A device for measuring the impedance of an electrical unit comprising a bridge circuit provided with input and output terminals and having standard impedances forming two of the legs thereof and said electrical unit and a variable impedance unit forming the remaining two legs thereof, said variable impedance unit including a plurality of impedance members, the first of said impedance members having a predetermined value of impedance and the impedance value of each of the remainder of said members being in a geometric progression relation to the impedance of the immediately preceding of said members, each of said impedance members having a plurality of equi-impedance tapped portions and contacts connected thereto, movable arms for electrically contacting said contacts, each of said arms having projections thereon for engaging projections on adjacent arms whereby each arm is moved by and together with the preceding arm upon movement of said preceding arm past a predetermined point, electrical connections joining said impedance members in series conducting relationship, each of said members being connected through an end tap and its corresponding contact arm, means for energizing said bridge through said input terminals, a reversible motor connected to be energized from the output terminals of said bridge upon the unbalance of said bridge, and a mechanical coupling between said motor and the contact arm associated with said first impedance member to cause balancing of said bridge by the selection of the proper impedance value of said impedance unit through movement of said contact arms.

2. An electrical measuring device for measuring the output voltage of a voltage source comprising a bridge circuit provided with input and output terminals and having standard impedances forming two of the legs thereof and said voltage source and a variable impedance unit forming the remaining two legs thereof, said variable impedance unit including a plurality of impedance members, the first of said impedance members having a predetermined value of impedance and the impedance value of each of the remainder of said members being in a geometric progression relationship to the impedance of the immediately preceding of said members, each of said impedance members having a plurality of equi-impedance tapped portions and contacts connected thereto, movable arms for electrically contacting said contacts, each of said arms having projections thereon for engaging projections on adjacent arms whereby each arm is moved by and together with the preceding arm upon movement of said preceding arm past a predetermined point, electrical connections joining said impedance members in series conducting relationship, each of said members being connected through an end tap and its corresponding contact arm, means for energizing said bridge through said input terminals, a reversible motor connected to be energized from the output terminals of said bridge upon the unbalance of said bridge, and a mechanical coupling between said motor and the contact arm associated with said first impedance member to cause balancing of said bridge by the selection of the proper impedance value of said impedance unit through movement of said contact arms.

3. In an electrical measuring device a variable impedance unit including a plurality of impedance members, the first of said impedance members having a predetermined value of impedance and impedance value of each of the remainder of said members being in a geometric progression relationship to the impedance of the immediately preceding of said members, each of said members having a plurality of equi-impedance tapped portions and contacts connected thereto, movable arms for electrically contacting said contacts, each of said arms having projections thereon for engaging projections on adjacent arms whereby each arm is moved by and together with the preceding arm upon movement of said preceding arm past a predetermined point, and electrical connections joining said impedance members in series conducting relationship, each of said members being connected through an end tap and its corresponding contact arm.

THEODORE M. BERRY.

REFERENCES CITED

The following references are of record in the file of this patent:

UNITED STATES PATENTS

| Number | Name | Date |
|---|---|---|
| 731,210 | Northrup | June 16, 1903 |
| 2,108,146 | Simpson | Feb. 15, 1938 |
| 2,555,491 | Hooven | June 5, 1951 |

FOREIGN PATENTS

| Number | Country | Date |
|---|---|---|
| 256,430 | Great Britain | Aug. 12, 1926 |